Figures 1, 2:
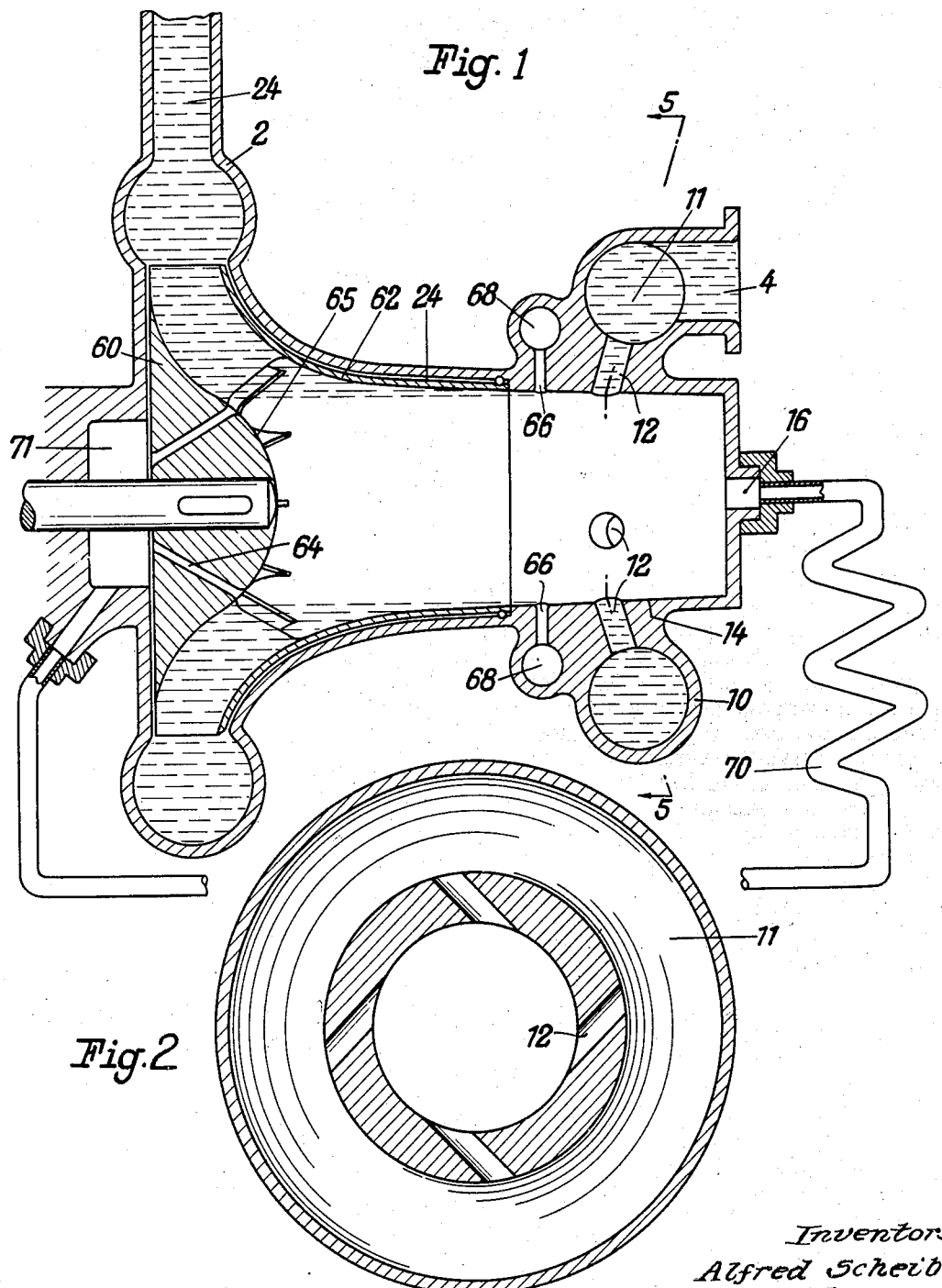

March 31, 1942. A. SCHEIBE ET AL 2,278,397

LIQUID PUMP AND GAS SEPARATOR

Filed Feb. 24, 1939

Inventors:
Alfred Scheibe,
Wilhelm Valerius,
Ludwig Wagenseil,

Bailey L Carson
Attorneys

Patented Mar. 31, 1942

2,278,397

UNITED STATES PATENT OFFICE 2,278,397

LIQUID PUMP AND GAS SEPARATOR

Alfred Scheibe and Wilhelm Valerius, Dessau, and Ludwig Wagenseil, Obermenzing, Germany, assignors to Junkers Flugzeug-und-Motorenwerke, Aktiengesellschaft, a corporation of Germany Application February 24, 1939, Serial No. 258,328
In Germany February 25, 1938

2 Claims. (Cl. 103—113)

This invention is directed to the separation of gas from a cooling fluid. The invention is particularly usable in the cooling system of an internal combustion engine.

An object of the invention is to separate gas from a cooling liquid by the difference in centrifugal force between the liquid and gas particles, and without an appreciable loss of velocity in the liquid.

Another object of the invention is to provide an apparatus for the centrifugal separation of gas from a cooling liquid, whereby no substantial friction loss can take place between the movement of the liquid and the wall of the separating apparatus.

A further object of the invention is to deliver fluid from a gas and fluid separator to a cooling pump at a velocity and pressure which will prevent the vaporization of the liquid on the intake side of the pump.

A further object of the invention is to construct a gas and liquid separating device in which the separation takes place under centrifugal action against a moving surface so that no appreciable energy is lost by the liquid passing through the apparatus.

A further object of the invention is to separate gas from a liquid which has a temperature at approximately its boiling point, with no further vaporization through loss of velocity and pressure taking place in the liquid when it leaves the apparatus and is passed to a cooling pump.

A further object of the invention is to separate steam from a steam and water mixture, to condense the steam, and to introduce the condensate back into the separated water without altering the velocity of the separated water, and without the use of additional apparatus for regulating the pressures and temperatures of the condensate and separated water.

In prior art devices in which liquid is separated from a gas under centrifugal action in a cylindrical vessel, and in which the gas, such as steam, has been condensed and recirculated with the liquid, special pumps are necessary in order to introduce the condensate into the fluid. These pumps contained two chambers, one for the fluid, and one for the condensate, and the outflow from each was passed to the cooling circuit of the engine. The objectionable feature of such pumps was that additional pressure means was necessary to regulate the quantities of liquid delivered by the chambers in order that the condensate could be introduced into the cooling circuit. Use of such pressure means made it very difficult to create and maintain the cooling fluid at a preferred temperature approximating its boiling point.

The objects of the instant case are, in general, obtained by constructing a movable cylinder within the liquid and gas separating device. The gas and liquid mixture is injected into the device against the inner wall of this movable cylinder, and as the liquid is whirled about the axis of the cylinder against the inner wall thereof, centrifugal forces are developed for the separation of gas from the liquid, while, at the same time, the velocity of the liquid is maintained, as there is substantially no friction loss between the liquid and the moving cylinder wall. Consequently, liquid having a temperature equal to, or greater than, its boiling point, injected into the cooling device as a fine stream, loses part of its gas, depending upon the heat of the liquid, before meeting the moving cylinder wall, and is slightly cooled. Further separation of gas from the liquid takes place against the moving cylinder wall, and the velocity of the liquid is undiminished as it is delivered to the intake side of the engine cooling chambers at a pressure sufficient to prevent the further vaporization of gas in said pump. The separated gas, as steam, is conducted to a condenser, and the condensate is then reintroduced to the liquid by being passed through bores in the moving cylinder. The condensate is thus given a velocity and a pressure substantially equal to that of the liquid, and is passed therewith to the engine.

Preferably, the movable cylinder and the cooling pump can be combined into a single device, the rotor of the pump being directly connected to the cylinder, thus insuring a delivery of the liquid to the pump at a desirable velocity and pressure.

The apparatus by which the objects of this invention are obtained is shown in the accompanying drawing, in which:

Fig. 1 is a cross sectional view showing the cooling pump and the movable cylinder formed as one unit; and Fig. 2 is a cross sectional view on the line 5—5 of Fig. 1.

The preferred form of the invention is shown in Fig. 1, wherein the casing or housing 2 of a cooling pump encloses a pump-rotor 60 which is extended into and integrally formed with a hollow cylinder 62. In other words, the cylinder 62 is mechanically driven with and by the pump rotor 60. Cylinder 62 lies on the intake side of pump rotor 60 and the velocity of the liquid within the cylinder 62 corresponds approximately to the velocity of the blades in the centrifugal pump, thereby ensuring that no further evaporation of gas from liquid will take place within the pump. The liquid is injected into the cylinder 62 through an annular passage 11, which surrounds the intake manifold casing 10 and is connected with the interior of said casing by means of the inlet ports 12. The axes of ports 12 are directed toward the opposite end of housing 2, and are inclined with respect to the longitudinal axis of the housing so that liquid flowing through the ports is directed substantially tangentially to the inner surface of the housing, note Fig. 2. The inner wall of the extended pump rotor, cylinder 62, adjoins the fixed inner wall 14 of the casing 10. Under centrifugal force, the lighter gas bubbles separate out of the liquid and gather in the center of the cylinder, from whence they pass out through the opening 16 to a condenser. The liquid entering port 4 under its own pressure passes through the ports 12 under substantially atmospheric pressure, or the pressure which corresponds to the interior of the cylinder 62. If the pressure of the water entering the port 4 is greater than the atmospheric pressure, the reduction in pressure will allow gas particles to separate immediately from the jets of liquid, and further separation of the gas particles from the liquid takes place under the centrifugal action of the liquid against the wall of cylinder 62. The liquid takes a helical path along the inner surface of cylinder 62 and is exhausted from housing 2 through port 24. As the velocity of the liquid has not been substantially reduced in its passage through the separating device, delivery to the engine takes place with a desired initial velocity of the liquid, and without the opportunity of further gas formation in the circulating cooling system of the engine by reason of a further decrease in the velocity of the liquid. The result attained in this manner is that after passing from the stationary guide wall 14 to the cylinder 62, the liquid is gradually accelerated without any notable drop in pressure to a velocity corresponding with the angular velocity of the pump rotor.

In order that a sufficient quantity of liquid be always present in the intake manifold 10 of the cooling pump, it is desirable that the quantity of liquid at the intake port of the pump be less than the suction capacity of the pump. Consequently, in order to remove the surplus liquid, bores 66 which divert the surplus into a discharge passage 68, may be provided in the stationary wall 14 of the separator.

The liquid and gas separating device shown is especially adapted for separating water from steam in a cooling system for an internal combustion engine; where the cooling liquid must absorb a great deal of heat. The heat absorbed by the liquid is given up in the form of steam in the separating device and the relatively cooled liquid again circulated through the engine cooling system. The engine is thus kept at an efficient temperature. In order to eliminate the use of a large supply tank to replace the water which is converted into steam during the cooling of the engine, it is desirable to condense the steam and to re-introduce it into the cooling system. Thus, as shown, the steam, instead of being passed through the port 16 into the atmosphere, can be conducted to a condenser 70, and then back through an annular passage 71 and through passages 64 in the hub 65 of the pump rotor 60 said passage opening into the pump intake chamber. Thus the condensed water is passed into the intake side of the cooling pump, and recirculated through the cooling system.

Having now described a means by which the objects of this invention are obtained, what we claim is:

1. A gas and liquid separator comprising a housing, a pumping rotor mounted for rotation in said housing at one end thereof, means for removing from said housing liquid centrifugally discharged from said rotor, a cylinder rotatable with said rotor on the inlet side thereof, inlet means for directing a fluid and gas mixture into said cylinder toward said pump and substantially tangential of the inner surface of said cylinder, whereby said fluid travels as a hollow cylindrical body toward said rotor and with a gradual increase in velocity until the velocity of said rotor is reached, and means for removing gases separated from said mixture during its passage through said cylinder through the housing opposite said rotor.

2. A gas and liquid separator as in claim 1, further comprising means for introducing condensed gases into said housing through the hub of said rotor.

LUDWIG WAGENSEIL.
ALFRED SCHEIBE.
WILHELM VALERIUS.